(12) United States Patent
Pauser et al.

(10) Patent No.: US 7,674,033 B2
(45) Date of Patent: *Mar. 9, 2010

(54) DYNAMIC MIXER

(75) Inventors: Helmut Pauser, Diessen (DE); Ingo Wagner, Worthsee (DE)

(73) Assignee: 3M ESPE AG, Seefeld (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/978,395

(22) Filed: Oct. 29, 2007

(65) Prior Publication Data

US 2008/0056061 A1 Mar. 6, 2008

Related U.S. Application Data

(63) Continuation of application No. 10/471,912, filed as application No. PCT/EP02/02481 on Mar. 6, 2002, now Pat. No. 7,287,898.

(30) Foreign Application Priority Data

Mar. 15, 2001 (DE) ................ 101 12 904

(51) Int. Cl.
- B01F 5/04 (2006.01)
- B01F 7/00 (2006.01)
- B01F 15/02 (2006.01)
- B01F 15/04 (2006.01)

(52) U.S. Cl. .............. 366/172.1; 366/172.2; 366/181.4; 222/145.5

(58) Field of Classification Search .............. 366/172.1, 366/172.2, 181.4; 222/145.5
See application file for complete search history.

(56) References Cited

U.S. PATENT DOCUMENTS

| | | | |
|---|---|---|---|
| 5,080,262 A | 1/1992 | Herold et al. | |
| 5,186,363 A | 2/1993 | Haynes | |
| 5,249,862 A | 10/1993 | Herold et al. | |
| 5,332,122 A | 7/1994 | Herold et al. | |
| 5,419,460 A | 5/1995 | Herold et al. | |
| 5,487,606 A | 1/1996 | Keller | |
| 5,493,078 A | 2/1996 | Uchiike | |
| 5,498,078 A | 3/1996 | Keller | |
| 6,129,244 A | 10/2000 | Horth | |
| 6,135,631 A | 10/2000 | Keller | |

(Continued)

FOREIGN PATENT DOCUMENTS

DE 42 12 863 A1 10/1992

(Continued)

OTHER PUBLICATIONS

U.S. Appl. No. 10/471,912, filed Sep. 15, 2003, Pauser et al., parent application.

*Primary Examiner*—Tony G Soohoo

(57) ABSTRACT

The invention relates to a dynamic mixer for mixing at least two paste components of different volume proportions. Said mixer comprises a housing with at least two inlet openings and at least one outlet opening, a mixer element being rotatably mounted in a mixing chamber of said housing. The housing has at least one delay chamber comprising a limiting wall that blocks the paste stream in the direction of flow and at least one opening that opens into the mixing chamber, said opening(s) being set back in relation to the limiting wall. The mixer is particularly suitable for mixing paste components with a relatively high viscosity of, for example, greater than 800 Pas.

27 Claims, 2 Drawing Sheets

U.S. PATENT DOCUMENTS

| | | |
|---|---|---|
| 6,161,730 A | 12/2000 | Heusser et al. |
| 6,244,740 B1 | 6/2001 | Wagner et al. |
| 6,328,182 B1 | 12/2001 | Brugner |
| 6,352,177 B1 | 3/2002 | Bublewitz et al. |
| 6,394,643 B1 | 5/2002 | Bublewitz et al. |
| 6,443,612 B1 | 9/2002 | Keller |
| 6,523,992 B1 | 2/2003 | Bublewitz et al. |
| 6,530,685 B1 | 3/2003 | Muhlbauer et al. |
| 6,620,125 B1 | 9/2003 | Redl |
| 6,837,612 B2 | 1/2005 | Bublewitz et al. |
| 6,932,243 B2 | 8/2005 | Keller |
| 7,287,898 B2 | 10/2007 | Pauser et al. |
| 7,316,330 B2 | 1/2008 | Muller et al. |
| 7,320,541 B2 | 1/2008 | Wagner et al. |
| 7,367,475 B2 | 5/2008 | Hörth et al. |
| 7,383,969 B2 | 6/2008 | Hörth et al. |
| 7,387,432 B2 | 6/2008 | Lu et al. |
| 2001/0005338 A1 | 6/2001 | Muhlbauer et al. |
| 2002/0175186 A1 | 11/2002 | Keller |
| 2003/0123323 A1 | 7/2003 | Bublewitz et al. |
| 2004/0257909 A1 | 12/2004 | Pieroni |
| 2005/0205606 A1 | 9/2005 | Nehren et al. |
| 2005/0226095 A1 | 10/2005 | Wagner et al. |
| 2005/0230422 A1 | 10/2005 | Muller et al. |
| 2005/0232073 A1 | 10/2005 | Wagner et al. |
| 2007/0175921 A1 | 8/2007 | Keller |
| 2008/0029542 A1 | 2/2008 | Keller |
| 2008/0056061 A1* | 3/2008 | Pauser et al. ............. 366/152.2 |
| 2008/0087683 A1 | 4/2008 | Wagner et al. |
| 2008/0099507 A9 | 5/2008 | Pauser et al. |
| 2008/0251535 A1 | 10/2008 | Suchan et al. |
| 2008/0314929 A1 | 12/2008 | Keller |
| 2009/0084815 A1 | 4/2009 | Paetow et al. |

FOREIGN PATENT DOCUMENTS

| | | |
|---|---|---|
| DE | 94 12703 U1 | 12/1994 |
| DE | 42 12 863 C2 | 5/1995 |
| DE | 298 18 499 U1 | 4/2000 |
| DE | 299 02 666 U1 | 8/2000 |
| DE | 101 64 385 C1 | 3/2003 |
| EP | 0 492 412 A1 | 7/1992 |
| EP | 0 541 972 A1 | 5/1993 |
| EP | 0 584 428 A1 | 3/1994 |
| EP | 0 492 412 B1 | 3/1995 |
| EP | 0 664 153 A1 | 7/1995 |
| EP | 0 584 428 B1 | 3/1996 |
| EP | 0 885 651 A1 | 12/1998 |
| EP | 0 664 153 B1 | 3/1999 |
| EP | 0 971 787 A1 | 1/2000 |
| EP | 0 541 972 B1 | 9/2000 |
| EP | 1 099 470 A1 | 5/2001 |
| EP | 1 106 243 A2 | 6/2001 |
| EP | 1 106 243 A3 | 6/2001 |
| EP | 1 110 599 A1 | 6/2001 |
| EP | 1 149 627 A2 | 10/2001 |
| EP | 1 149 627 A3 | 10/2001 |
| EP | 0 971 787 B1 | 8/2002 |
| EP | 0 885 651 B1 | 11/2002 |
| EP | 1 110 599 B1 | 4/2003 |
| WO | WO 98/43727 A1 | 10/1998 |
| WO | WO 00/21652 A1 | 4/2000 |
| WO | WO 00/21653 A1 | 4/2000 |
| WO | WO 02/074426 A1 | 9/2002 |
| WO | WO 03/055582 A1 | 7/2003 |

* cited by examiner

DYNAMIC MIXER

The present application is a continuation of U.S. patent application Ser. No. 10/471,912, filed 15 Sep. 2003, now U.S. Pat. No. 7,287,898, which is a U.S. National Stage Application of PCT/EP02/02481, filed 6 Mar. 2002, and which also claims the benefit under 35 U.S.C. §119 of foreign application no. DE 101 12 904.1, filed 15 Mar. 2001. All of the above-identified applications are hereby incorporated by reference in their entirety.

The present invention relates to a dynamic mixer for mixing at least two paste components with different volume ratios, comprising a housing which has a delay chamber for the paste component with the higher proportion by volume. The mixer is suitable in particular for mixing paste components with a relatively high viscosity of, for example, greater than 800 Pas.

BACKGROUND OF THE INVENTION

DE 298 18 499 U discloses a mixer for producing pastes from components with different proportions by volume, which has a delay chamber. The latter forms a bypass channel which prolongs the path from an inlet opening to a mixer element and runs along a curve around the longitudinal axis. This mixer constitutes a further development of the dynamic mixer disclosed by EP 0 492 412 A1.

Also known are static mixers, as they are called, which, as opposed to a dynamic mixer, have no moving parts. Mixers of this type are suitable only for mixing and discharging relatively thin substances, cf. EP 0 885 651 A1, EP 0 664 153 A1 or EP 0 584 428 A1.

As distinct from the dynamic mixer, which swirls the components to be mixed, in the static or flow mixer mixing is carried out by repeated stream division.

In the case of mixing with a delay chamber, for reasons connected with reducing the overall length, this is preferably configured in such a way that the paste component flowing in, which enters the mixer longitudinally, is regularly deflected through about 90°. The actual delay section is thus located transversely with respect to the rotatably mounted mixing element, cf. EP 1 099 470 A1.

At the end of the delay section, the paste component either flows directly into the mixing chamber or the paste component enters the mixing chamber offset through about 90°, so that the flow direction of the paste component changes once again.

In this case, the delay chamber can extend both in only one direction with one outlet and in two directions with, correspondingly, two outlets.

The deflection of the entire paste stream of a component induces very high frictional losses in the paste, which increase the flow resistance considerably. The force necessary to convey the pastes, which is transmitted to the pastes via delivery pistons, therefore rises sharply.

It is therefore possible for the dynamic mixers known hitherto to be used only for mixing pastes which have an average consistency and ability to stand without settling. Such pastes usually have a viscosity in the range from 200 to 800 Pas.

However, omitting the delay chamber is not possible, since it is precisely paste with a high ability to stand without settling and a high viscosity in which one component tends to run ahead to a particularly great extent.

SUMMARY OF THE INVENTION

The primary object of the present invention is thus to provide an improved mixer, in particular for mixing highly viscous pastes.

This object is achieved by providing a dynamic mixer and a method as described in the claims.

The terms "comprise" or "contain" do not introduce a complete enumeration of features. The circumstance in which, in the claims, the word "one" is used before citing a feature does not rule out the case in which the aforementioned features can be present in a plurality, in the sense of "at least one".

Surprisingly, it has been shown that, if an opening is made within the delay chamber which is set back with respect to the boundary wall which stops or terminates the paste stream in the flow direction, the function of this chamber—to ensure that no paste component emerges from the mixer unmixed or to ensure a retarded entry into the mixing chamber—remains largely maintained.

The boundary wall is a constituent part of the delay chamber and is regularly located at the point which is most remote from the inlet opening which opens into the delay chamber. Since the delay chamber is normally configured in the manner of an annular segment and runs along a curve about the longitudinal axis of the mixer, the boundary wall represents an end face of the annular segment which, depending on the embodiment, can be planar or curved.

No boundary wall of the delay chamber in the sense of the invention is a baffle surface arranged opposite the inlet opening, which the incoming paste component strikes substantially directly after entering the mixer without being deflected substantially.

Surprisingly, it has been shown that the delay chamber is initially largely completely filled before the paste component enters the actual mixing chamber. This may be explained by a flow resistance produced by the rotating mixing blades, which prevents the paste entering the mixing chamber until the delay chamber has been filled.

The fact that the opening which leads from the delay chamber into the mixing chamber is set back with respect to the boundary wall means that there is a reduction in the conveying force to be applied by the mixing appliance, since the paste component is deflected only slightly after the delay chamber has been filled, depending on the arrangement of the opening.

The paste component flowing into the delay chamber is initially deflected through about 90° as it flows in and fills the delay chamber without substantially getting into the mixing chamber. Since, in this state, the mixing chamber has not yet been filled, the conveying forces to be applied in this case are relatively uncritical.

However, once the paste stream reaches the boundary wall, the static pressure which builds up has the effect that the paste component gets into the mixing chamber through the set-back opening.

The conveying forces to be applied by the mixing appliance decrease with increasing distance of the opening from the boundary wall, so that even highly viscous materials can be mixed dynamically with the mixer according to the invention.

The mixer according to the invention thus permits the preparation of pastes which, in the case of the component with the greater proportion by volume, have a considerably higher viscosity than 800 Pas, without mechanical overloading of the system, comprising the mixing appliance, the inserted cartridge and the mixer, occurring.

The viscosity may be determined, for example, with a Brookfield DV III rheometer (spindle HB 5, bar width 15.5 mm, speed 5 rpm, reading 20 s after start).

In practical terms, the viscosity can be determined in the following way:

After being switched on and adjusted, the rheometer is provided with the measuring spindle HB5 (bar width=15.5 mm). The paste to be measured and having the higher proportion by volume is firstly kneaded by hand for about 40 seconds and then put into a measuring cup, as far as possible without bubbles. Material packaged in tubular plastic bags is put into the measuring cup directly from a commercially available mixing appliance (for example Pentamix® 2 from 3M ESPE AG). The filling level should be at least 30 mm.

Without any time delay, the filled measuring cup is then placed in the cup holder stand and the measuring spindle lowered centrally into the paste. The test is then started. The measured value, displayed as mPas in the display, is read 20 seconds after the start of the measurement.

Care must be taken that at no time during the measurement is the measuring cup carried along by the rotation of the spindle.

The term opening in the sense of the present invention is to be understood to mean both inlet openings and outlet openings. This depends on the direction in which the substances to be mixed flow or are pressed.

A mixer normally has two inlet openings and only one outlet opening.

Round, oval openings and/or openings of kidney or sickle shape, in particular openings with rounded edges and corners, are advantageous.

A shape of this type permits an optimized arrangement of the inlet openings around the accommodation opening for the driveshaft, normally located in the center of a dynamic mixer. Furthermore, this shape permits the utilization of virtually the entire surface of a dynamic mixer which is available for the inlet openings.

The apparatus according to the invention preferably has at least two, but possibly also three or four, openings.

These openings are usually arranged symmetrically around the opening for the driveshaft.

The apparatus according to the invention, in the form of a dynamic mixer, normally comprises at least three components, in particular a baseplate, into which the inlet openings and the holding opening for the driveshaft are introduced, and a rotor which is rotatably mounted in the baseplate and to which mixing blades are fitted and a shaped groove to accommodate the driveshaft, and also the housing in which the rotor runs.

The shape of the groove for the driveshaft is any desired shape, under the assumption that a force sufficient to start mixing can be transmitted from the driveshaft to the mixing blades.

Openings with edges have proven to be beneficial for transmitting the torque from the driveshaft to the rotor. The shaped groove for the driveshaft is preferably triangular, rectangular, square, pentagonal, hexagonal, heptagonal, octagonal or has another geometric shape with edges.

Mixing element is to be understood to mean that part of the mixer which is rotatably mounted, has mixing blades and can be driven by a mixer shaft.

Delay chamber in the sense of the invention is to be understood to mean a chamber or a bypass channel through which a paste component has to pass before it can enter the mixing chamber. The delay chamber has an inlet opening, which normally coincides with the inlet opening of the mixer, and at least one outlet opening, which opens into the mixing chamber.

The shape of the delay chamber is in principle any desired shape. A shape extending along a curve about the longitudinal axis of the mixer has proven to be advantageous, in order to keep the overall length of the mixer short. The delay chamber preferably has the form of an annular segment which extends over an angular range from greater than 0 to less than 180°, preferably in the range from 90 to less than 180°.

The chamber has, inter alia, a boundary wall located in the flow direction of a paste component, on which the paste component backs up. According to the invention, the chamber also has at least one opening, which opens into the mixing chamber and which is arranged to be set back with respect to the boundary wall.

The term set back in the sense of the invention is to be understood to mean an arrangement in which the opening does not adjoin the boundary wall directly but is arranged offset from the latter.

If the delay chamber has only this one opening into the mixing chamber, this has the effect that the backed-up paste component does not get into the mixing chamber at the point at which the boundary wall is located but only at a point set back with respect to the latter in the flow direction. This opening is preferably set back with respect to the boundary wall along the circumferential direction, in particular by an angle in the range from 90 to 180° with its center in the mixer axis.

The paste component with the higher proportion by volume is thus normally guided initially in a curved shape about the longitudinal axis, backed up on the boundary wall there and only comes into contact with the paste component with the lower proportion by volume in the region of the mixing element.

As soon as the delay chamber has been filled, the paste component with the higher proportion by volume subsequently flowing in and entering the mixer advantageously experiences only one deflection of its direction, which is less than 90°, preferably less than 45°, before it enters the mixing chamber.

In this way, a reduction can be achieved in the force which is required to discharge highly viscous pastes, in particular, for example with a viscosity of greater than 800 Pas.

The ratio of the volume of the delay chamber to the volume of the mixing chamber is normally in the range from 1:1 to 1:20, preferably in the range from 1:3 to 1:5. The delay chamber normally has an absolute volume in the range from 0.1 to 10 ml, preferably in the range from 0.3 to 2 ml. The volume of the delay chamber also includes the region of the inlet opening which opens into the delay chamber. The volume of the mixing chamber results from the difference between the total volume provided by the housing of the mixer minus the volume of the delay chamber and the volume which is taken up by the mixing screw.

If the ratio lies outside this range, there is regularly either inadequate delay of one paste component or the mixer has too large a dead volume, associated with an undesirably large quantity of paste to be discarded.

The shape of the opening which opens into the mixing chamber is in principle any desired shape. In essence, round, rectangular and triangular openings are suitable. The opening area is normally only a few $mm^2$, preferably 1 to 100 $mm^2$.

In a preferred embodiment, the delay chamber has a plurality of openings, in particular two or three openings, which open into the mixing chamber. In this case, the further openings can also be located directly in the region of the boundary wall or adjoin the latter.

An opening into the mixing chamber which is arranged directly in the region of the boundary wall is advantageous if it is to be ensured that the air which would be compressed in the delay chamber by the inflow of the paste component to be delayed can escape into the mixing chamber. This is beneficial in particular if it is to be ensured that no air is included in the paste to be mixed. If the paste is a dental molding compound, air included in the mixed paste regularly leads to a debased quality of a bite impression taken by using the mixed paste.

The delay chamber can be arranged symmetrically or asymmetrically in the mixer. It can also extend only in one circumferential direction, but also in both circumferential directions.

In a further preferred embodiment, the set-back opening in the delay chamber is arranged in such a way that, at least at one point, it is opposite the inlet opening to the delay chamber. The opening in the delay chamber which opens into the mixing chamber is preferably half-offset with respect to the inlet opening. In this embodiment, it is thus theoretically possible for some of the paste component to get directly into the mixing chamber without previously being backed up in the delay chamber. In particular in the case of highly viscous pastes, however, it has surprisingly been shown that this does not normally occur, but that the delay chamber is filled first.

In order to effect deflection of the flow direction of one of the paste components into the delay chamber, it is advantageous for a baffle surface to be arranged opposite the inlet opening into the delay chamber, which prevents the paste component entering the mixing chamber without being deflected into the delay chamber. This baffle surface normally results automatically if the opening of the delay chamber which opens into the mixing chamber is arranged to be offset somewhat laterally with respect to the inlet opening—as viewed in the flow direction.

In a particularly preferred embodiment, about 50% of the opening area which opens into the mixing chamber is opposite the inlet opening. In such an arrangement, the frictional forces occurring as a result of deflection of the paste stream are largely minimized without impairing the function of the antechamber.

Depending on the rotational speed of the mixing blades and/or the viscosity of the components to be mixed, the presence of a baffle surface may possibly not be absolutely necessary. The flow resistance produced by the rotating mixing blades may be sufficient in order that a paste component enters the delay chamber before it is mixed with the other paste component in the mixing chamber and discharged.

The ratio of the areas of the openings of the inlet for the paste component with the higher proportion by volume to the outlet opening of the mixer for the mixed paste is normally in the range from 1:1 to 1:5. A ratio differing from this has proven to be disadvantageous, in particular when mixing highly viscous pastes, as a result of the frictional losses which occur.

Suitable materials from which the mixer can be produced comprise metal, glass and/or plastics, the latter being preferred.

Suitable plastics are, for example, those which have a modulus of elasticity in the range from 200 to 3000 N/mm$^2$ and/or an elongation at break in the range from 15 to 200%.

Suitable materials for the mixer comprise PA, PE, OPP, PP, PTFE, PC, PS and/or POM. The materials can also be used in fiber-reinforced and/or filled form.

Suitable fibers and fillers comprise glass fibers/particles and carbon fibers/particles.

Suitable mixers and/or cartridge fronts can be produced, for example, in the injection molding process, if necessary in a 2-component injection molding process. However, production by means of material-removing processes is also conceivable.

The mixer according to the invention can be used in all technological areas, in particular for mixing highly viscous, pasty and/or semifluid compounds.

This is generally understood to include substances which, in the stored state, are kept separately in at least two components and have to be mixed before use.

The following may be cited as examples: adhesives, joint sealing compounds, coatings.

The mixers according to the invention may preferably be used in the dental sector. The apparatuses according to the invention are particularly suitable for mixing highly viscous molding materials which, for example, are pressed out of tubular plastic bags, which are inserted into suitable cartridges, by electrically driven pistons. Conceivable and possible is also the discharge of the materials from suitable cartridges, which are filled directly with the material without a tubular plastic bag being used.

Materials which may be cited as examples are silicon rubbers, polyethers, polyether silicones, epoxy resins and polyurethanes.

The subject of the invention is also the combination of a dynamic mixer and an electrically operated mixing appliance, on which the mixer can be placed or to which the mixer can be fitted. Suitable mixing appliances have a mixer shaft and one or more delivery pistons.

It has been shown that, in order to achieve a usable mixing result without mechanical detriment to the mixing appliance, the cartridges, the tubular plastic bags or the mixer, the conveying force which is transmitted via the pistons to the pastes to be mixed should not significantly exceed the magnitude of about 4000 N.

A suitable mixing appliance is described, for example, in EP 0 541 972 A.

The subject of the present invention is also a method for mixing at least two paste components with different proportions by volume.

Here, the method comprises the following steps:
a) discharging at least two paste components A and B from a container, preferably from a container similar to a cartridge, into which, if appropriate, tubular plastic bags can be inserted,
b) introducing the components A and B into a dynamic mixer which can be connected to the container,
c) mixing the components A and B by using the dynamic mixer,
d) discharging the mixture of A and B from the mixer.

The mixer used has a mixing chamber and a delay chamber placed upstream of the latter, which has a boundary wall that stops the paste stream in the flow direction.

The paste component A with the higher proportion by volume entering the mixer fills the delay chamber and is backed up on the boundary wall there before it is mixed with the paste component B and discharged from the mixer.

BRIEF DESCRIPTION OF THE DRAWINGS

Preferred exemplary embodiment will be explained below using the drawings, in which.

DESCRIPTION OF EXEMPLARY EMBODIMENTS OF THE INVENTION

Figure 1:
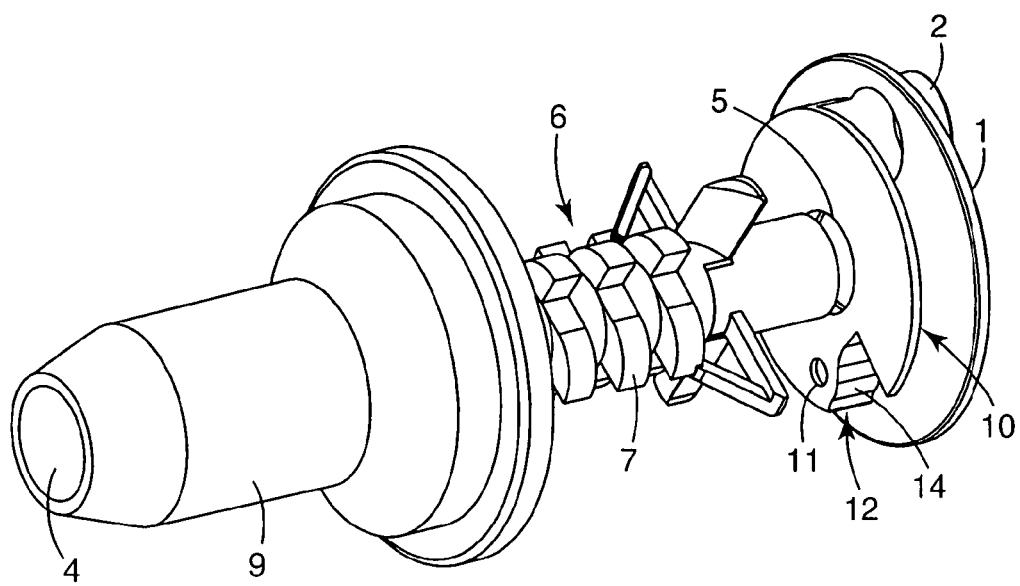
FIG. 1 shows an exploded drawing of a mixer according to DE 298 18 499 U.

The mixer according to FIG. 1 is known from the prior art. It has a baseplate 1 with two inlet openings 2 and 3, a housing 9 with an outlet opening 4 and a mixing element 6. The mixing element 6 is provided with mixing blades 7. The delay chamber 10 extends along a curve around the longitudinal axis of the mixer and is closed off by a boundary wall 14. Immediately on the boundary wall 14 there is an opening 12 for the paste component A, which opens into the mixing chamber. The paste component B with the lower proportion by volume opens into the mixing chamber via the opening 11.

The paste component A initially runs guided along the faces 1 and 15 and is stopped by the boundary wall 14 arranged transversely with respect to them. The opening 13 for the outlet of the component A from the delay chamber into the mixing chamber is arranged in the baffle plate 15 at a distance from the boundary wall 14, set back counter to the initial paste flow direction of the component A.

Figure 2:
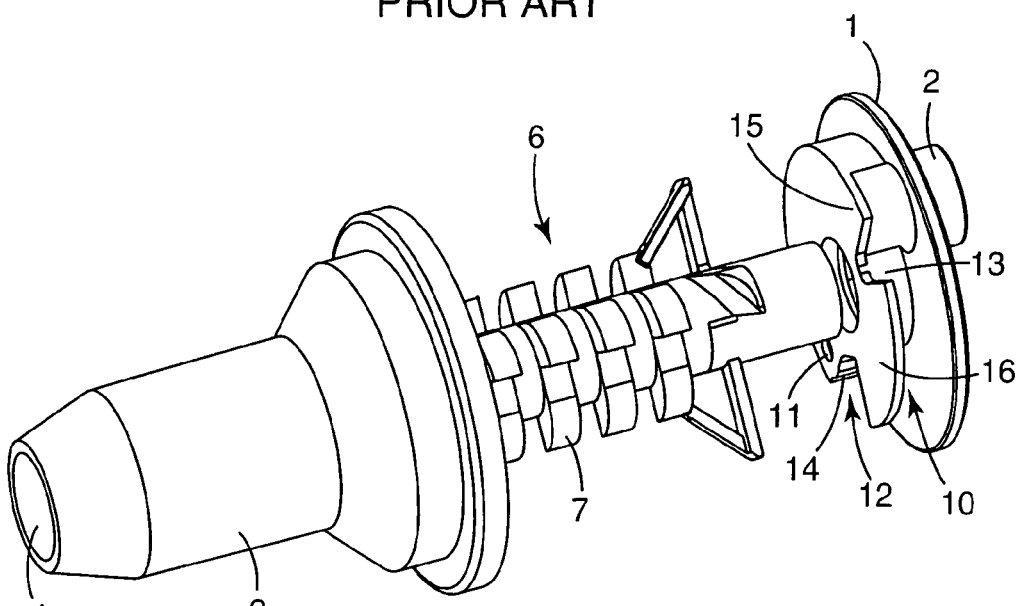
FIG. 2 shows an exploded drawing of the mixer according to the invention.

FIG. 2 illustrates an embodiment of a mixer according to the invention in an exploded drawing. The mixer has substantially the same elements as the mixer illustrated in FIG. 1. In addition, however, the mixer according to the invention has an opening 13 which is set back with respect to the boundary wall 14. The opening 12, which adjoins the boundary wall 14 directly, is optional. The delay chamber 10 preferably extends along a curve around the longitudinal axis of the mixer and, inter alia, is formed by the boundary wall 14, the underside of the baseplate 1, the baffle plate 15 located opposite the inlet opening 2 and the circular-segment-shaped element 16.

Figure 3:
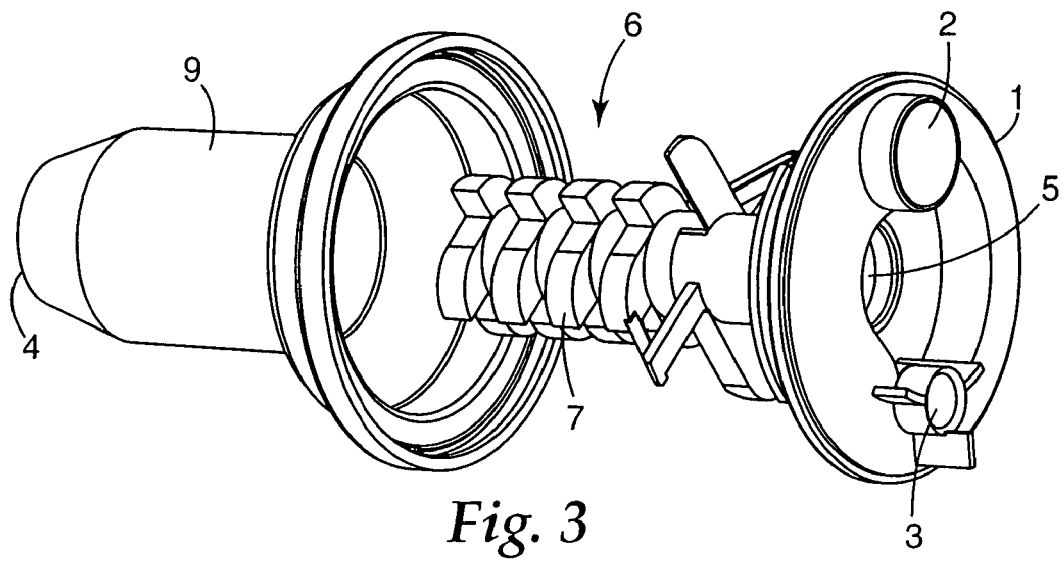
FIG. 3 shows an exploded drawing of the mixer according to the invention according to FIG. 2 in a rear view.

In FIG. 3, the mixer according to FIG. 2 is illustrated from a different perspective. It is possible to see in particular the two inlet openings 2 and 3 for the two paste components A and B, which are integrally molded on the baseplate 1, the accommodating opening 5 for the mixing screw 6 and the six-cornered shaped groove 8, in which the driveshaft for the mixing screw 6 can engage.

Figure 4:
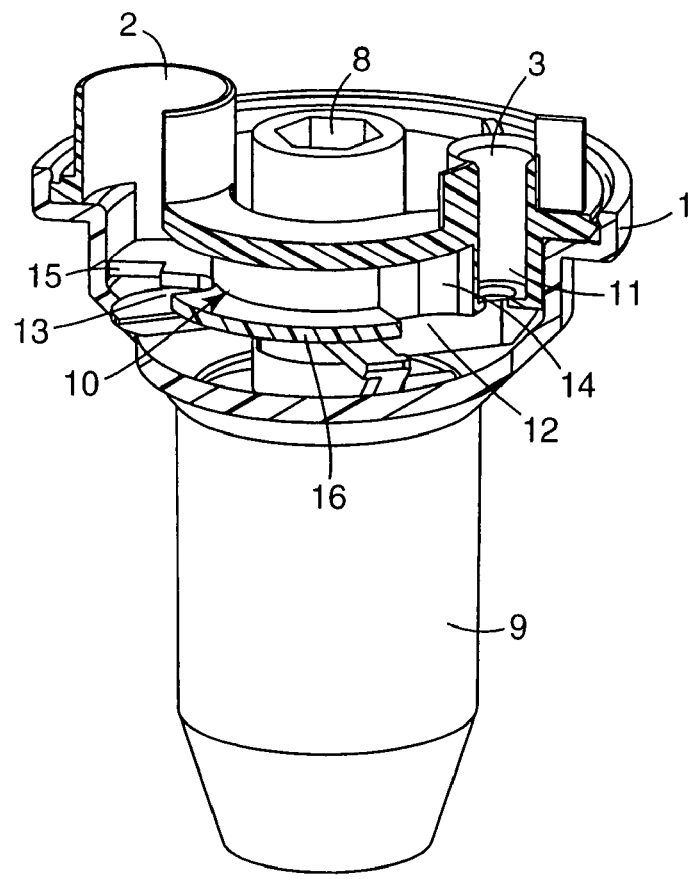
FIG. 4 shows a sectional drawing through the inlet region of the mixer.

FIG. 4 shows a sectional drawing through the inlet region of the mixer according to FIGS. 2 and 3. It is possible to see in particular the flow ducts for the two paste components A and B. The paste component B enters the mixer through the opening 3 and, without substantial deflection, passes via the opening 11 into the mixing chamber, in which the mixing blades 7 rotate. The paste component A enters the mixer via the opening 2, strikes the baffle plate 15, is deflected through about 90° there and led into the delay chamber along the circular-segment-shaped [lacuna]. The paste stream is stopped by the boundary wall 14; the air backed up can escape through the opening 12. As soon as the delay chamber has been filled, the paste component A can enter the mixing chamber via the opening 12 and, in particular, the opening 13 set back with respect to the boundary wall.

LIST OF DESIGNATIONS

1. Baseplate
2. Inlet opening A
3. Inlet opening B
4. Outlet opening
5. Accommodating opening for the driveshaft
6. Mixing element
7. Mixing blade
8. Shaped groove
9. Housing
10. Delay chamber
11. Opening for the paste B into the mixing chamber
12. Opening for the paste A into the mixing chamber
13. Set-back opening for the paste A into the mixing chamber
14. Boundary wall
15. Baffle surface
16. Circular segment

The invention claimed is:

1. A dynamic mixer that comprises:
   a housing comprising a first inlet opening, a second inlet opening, an outlet opening, and a mixing chamber, wherein the second inlet opening opens into the mixing chamber and wherein the outlet opening opens out of the mixing chamber;
   a rotatable mixing element mounted in the mixing chamber, wherein the rotatable mixing element rotates about a rotation axis that extends through the housing; and
   a delay chamber comprising a delay chamber volume, wherein the delay chamber is located in the housing, and wherein the delay chamber comprises a length between a first end and a second end, and further wherein the first inlet opening opens into the delay chamber; and
   a setback opening located between the delay chamber and the mixing chamber, wherein the setback opening is spaced from the second end of the delay chamber such that a portion of the delay chamber volume is located between the setback opening and the second end of the delay chamber, and further wherein the setback opening is located at a position along the length of the delay chamber that is between the first inlet opening and the second end of the delay chamber.

2. The dynamic mixer of claim 1, wherein the first inlet opening opens into the delay chamber proximate the first end of the delay chamber.

3. The dynamic mixer of claim 1, wherein the delay chamber comprises an air vent opening.

4. The dynamic mixer of claim 1, wherein a ratio of the volume of the delay chamber to the volume of the mixing chamber is in a range from 1:1 to 1:20.

5. A dynamic mixer that comprises:
   a housing comprising a first inlet opening, a second inlet opening, an outlet opening, and a mixing chamber, wherein the second inlet opening opens into the mixing chamber and wherein the outlet opening opens out of the mixing chamber;
   a rotatable mixing element mounted in the mixing chamber, wherein the rotatable mixing element rotates about a rotation axis that extends through the housing; and
   a delay chamber comprising a delay chamber volume, wherein the delay chamber is located in the housing, and wherein the delay chamber comprises a length between a first end and a second end, and further wherein the first inlet opening opens into the delay chamber between the first end and the second end of the delay chamber; and
   a setback opening located between the delay chamber and the mixing chamber, wherein the setback opening is spaced from the second end of the delay chamber such that a portion of the delay chamber volume is located between the setback opening and the second end of the delay chamber, and further wherein the setback opening is located at a position along the length of the delay chamber that is between the first inlet opening and the second end of the delay chamber; and wherein the setback opening and the first inlet opening are arranged such that at least a portion of the setback opening is located directly opposite from the first inlet opening across the delay chamber.

6. The dynamic mixer of claim 5, wherein the setback opening and the first inlet opening are arranged such that at least a portion of the setback opening is located directly opposite from the first inlet opening across the delay chamber.

7. The dynamic mixer of claim 5, wherein the setback opening and the first inlet opening are arranged such that about 50% of the setback opening is located directly opposite from the first inlet opening across the delay chamber.

8. The dynamic mixer of claim 5, further comprising a baffle located proximate the first inlet opening.

9. A dynamic mixer that comprises:
a housing comprising a mixing chamber, first inlet opening, a second inlet opening, and an outlet opening, wherein the second inlet opening opens into the mixing chamber and wherein the outlet opening opens out of the mixing chamber;
a rotatable mixing element mounted in the mixing chamber, wherein the rotatable mixing element rotates about a rotation axis that extends through the housing;
a curved delay chamber located in the housing, wherein the curved delay chamber extends in an annular segment about the rotation axis, and wherein the curved delay chamber comprises a first end and a second end, and further wherein the first inlet opening opens into the curved delay chamber; and
a setback opening located between the curved delay chamber and the mixing chamber, wherein the setback opening is spaced from the second end of the curved delay chamber such that a portion of the annular segment of the curved delay chamber is located between the setback opening and the second end of the curved delay chamber, and further wherein the setback opening is located at a position along the curved delay chamber that is between the first inlet opening and the second end of the curved delay chamber.

10. The dynamic mixer of claim 9, wherein the first inlet opening opens into the curved delay chamber proximate the first end of the curved delay chamber.

11. The dynamic mixer of claim 9, wherein the setback opening is spaced from the second end of the curved delay chamber by an angle of 90 degrees or more, wherein the center of the angle is located on the rotation axis.

12. The dynamic mixer of claim 9, wherein the annular segment of the curved delay chamber extends over an annular range that is less than 180 degrees.

13. The dynamic mixer of claim 9, wherein the annular segment of the curved delay chamber extends over an annular range that is 90 degrees or more.

14. The dynamic mixer of claim 9, wherein the setback opening and the first inlet opening are arranged such that at least a portion of the setback opening is located opposite from the first inlet opening across the delay chamber along a flow direction into the delay chamber through the first inlet opening.

15. The dynamic mixer of claim 9, wherein the setback opening and the first inlet opening are arranged such that about 50% of the setback opening is located opposite from the first inlet opening across the delay chamber along a flow direction into the delay chamber through the first inlet opening.

16. The dynamic mixer of claim 9, further comprising a baffle located proximate the first inlet opening.

17. The dynamic mixer of claim 9, wherein the delay chamber comprises an air vent opening.

18. The dynamic mixer of claim 9, wherein a ratio of a volume of the delay chamber to a volume of the mixing chamber is in a range from 1:1 to 1:20.

19. A dynamic mixer that comprises:
a housing comprising a mixing chamber, first inlet opening, a second inlet opening, and an outlet opening, wherein the second inlet opening opens into the mixing chamber and wherein the outlet opening opens out of the mixing chamber;
a rotatable mixing element mounted in the mixing chamber, wherein the rotatable mixing element rotates about a rotation axis that extends through the housing;
a curved delay chamber located in the housing, wherein the curved delay chamber extends in an annular segment about the rotation axis, and wherein the curved delay chamber comprises a first end and a second end, and further wherein the first inlet opening opens into the curved delay chamber between the first end and the second end of the curved delay chamber; and
a setback opening located between the curved delay chamber and the mixing chamber, wherein the setback opening is spaced from the second end of the curved delay chamber such that a portion of the annular segment of the curved delay chamber is located between the setback opening and the second end of the curved delay chamber, and further wherein the setback opening is located at a position along the curved delay chamber that is between the first inlet opening and the second end of the curved delay chamber;
wherein the setback opening is spaced from the second end of the curved delay chamber by an angle of 90 degrees or more, wherein the center of the angle is located on the rotation axis;
and wherein the annular segment of the curved delay chamber extends over an annular range that is 90 degrees or more;
and further wherein the setback opening and the first inlet opening are arranged such that at least a portion of the setback opening is located directly opposite from the first inlet opening across the delay chamber.

20. A method of mixing components in a dynamic mixer, the method comprising:
delivering a first component into a delay chamber of a dynamic mixer through a first inlet, wherein the delay chamber comprises a delay chamber volume, and wherein the delay chamber comprises a length between a first end and a second end;
delivering the first component from the delay chamber to a mixing chamber of the dynamic mixer through a setback opening, wherein the setback opening is spaced from the second end of the delay chamber such that a portion of the delay chamber volume is located between the setback opening and the second end of the delay chamber such that the setback opening is located at a position along the length of the delay chamber that is between the first inlet opening and the second end of the delay chamber;
delivering a second component into a mixing chamber of a dynamic mixer; and
rotating a mixing element in the mixing chamber while delivering the first component and the second component to the mixing chamber.

21. The method of claim 20, wherein at least a portion of the first component enters the portion of the delay chamber volume that is located between the setback opening and the second end of the delay chamber.

22. The method of claim 20, wherein the first component substantially fills the portion of the delay chamber volume that is located between the setback opening and the second end of the delay chamber.

23. The method of claim 20, wherein a portion of the first component passes into the mixing chamber through the first inlet, the delay chamber, and the setback opening while being deflected less than 90 degrees.

24. The method of claim 23, wherein the first inlet and the setback opening are arranged such that at least a portion of the setback opening is located directly opposite from the first inlet opening across the delay chamber.

25. The method of claim 20, wherein a volume of the first component delivered to the mixing chamber is greater than a volume of the second component delivered to the mixing chamber.

26. The method of claim 25, wherein the first component has a viscosity of at least 800 Pas.

27. The method of claim 20, wherein one or both of the first component and the second component are selected from the group consisting of silicone rubbers, polyethers, polyether silicones, epoxy resins, and polyurethanes.

* * * * *